US007913453B2

(12) United States Patent
Kerber et al.

(10) Patent No.: US 7,913,453 B2
(45) Date of Patent: Mar. 29, 2011

(54) POTATO QUALITY

(75) Inventors: Elmar Kerber, Basel (CH); Duncan McKenzie, Basel (CH)

(73) Assignee: Syngenta Crop Protection, Inc., Greensboro, NC (US)

( * ) Notice: Subject to any disclaimer, the term of this patent is extended or adjusted under 35 U.S.C. 154(b) by 284 days.

(21) Appl. No.: 12/097,280

(22) PCT Filed: Nov. 28, 2006

(86) PCT No.: PCT/EP2006/011403
§ 371 (c)(1),
(2), (4) Date: Jun. 13, 2008

(87) PCT Pub. No.: WO2007/068348
PCT Pub. Date: Jun. 21, 2007

(65) Prior Publication Data
US 2008/0307844 A1    Dec. 18, 2008

(30) Foreign Application Priority Data
Dec. 15, 2005    (GB) .................................. 0525564.1

(51) Int. Cl.
*A01G 1/00* (2006.01)
(52) U.S. Cl. ......................................... 47/89; 71/DIG. 2
(58) Field of Classification Search .... 47/89; 71/DIG. 2
See application file for complete search history.

(56) References Cited

U.S. PATENT DOCUMENTS

| 3,051,563 A * | 8/1962 | Bersworth .......................... 71/1 |
| 3,574,592 A | 4/1971 | Hartung |
| 4,786,307 A * | 11/1988 | Marihart ........................... 71/11 |
| 5,962,717 A | 10/1999 | Nonomura et al. |
| 2002/0121046 A1 | 9/2002 | Yamashita |

FOREIGN PATENT DOCUMENTS

| EP | 0334630 | 9/1989 |
| WO | 9814412 | 4/1998 |
| WO | 0138262 | 5/2001 |
| WO | 2005095305 | 10/2005 |

OTHER PUBLICATIONS

Carlos Garcia Mata et al, "Involvement of iron and ferritin in the potato-Phytophthora infestans interaction", European Journal of Plant Pathology (2001) 107 (5), 557-562. (no month).*
N. P. Bitiutskii et al, "Effect of synthetic chelators and chelates on the chemical composition of plants" Agrokhimiya (1991), (10), 99-107. (no month).*
A. F. A. Fawzi et al "Response of potato to application of micronutrients and to nitrogen-phosphorus-potassium levels", Egyptian Journal of Botany (1986), 26 (1-3), 91-100. (no month).*
Ora Smith et al, "Potato quality. VIII. Effect of foliar applications of seqestering and chelating agents on after-cooking darkening", American Potato Journal (1954), 31 (no month).*
Gus Carnes, "Has your plant had its iron lately? Try a chelating agent", New Jersey Agriculture (1954), 36 (No. 4), 8-9, 11. (no month).*

* cited by examiner

*Primary Examiner* — Wayne Langel
(74) *Attorney, Agent, or Firm* — William A. Teoli, Jr.

(57) ABSTRACT

Potato quality is improved by applying to the plant or to the locus of the plant a composition comprising (a) a compound capable of forming a chelate with iron or (b) a chelate of iron with a chelate-forming compound. Specific quality improvements include increasing the dry matter content, increasing the starch content and reducing the reducing sugar content. A preferred iron chelate is that of EDDHA, available commercially as SEQUESTRENE 138 Fe 100.

6 Claims, No Drawings

POTATO QUALITY

This application is a 371 of International Application No. PCT/EP2006/011403 filed Nov. 28, 2006, which claims priority to GB 0525564.1 filed Dec. 15, 2005, the contents of which are incorporated herein by reference.

The present invention relates to improvements in or relating to potato quality.

Iron is essential for several biochemical and physiological processes inside plants, including the formation of chlorophyll. Since iron has low plant mobility, new growth in plants often shows iron deficiency, particularly in soils that are high in pH, calcareous or have heavy clay content that ties up the iron. It is known to apply iron chelates to plants to counteract iron deficiency. Thus for example the commercial product SEQUESTRENE 138 Fe 100 (SEQUESTRENE is a trademark) is recommended for the correction of iron deficiency in all kinds of crops and ornamentals in alkaline and calcareous soils. SEQUESTRENE 138 Fe 100 has as its active ingredient EDDHA NaFe, which is a mixture of the sodium salt of iron (III) complexes of the two diastereoisomers of Ethylenediamine-N,N'-di(2-hydroxy-phenylacetate) and iron (III) complexes of the two diastereoisomers of ethylene diamine-N-(2-hydroxy-phenylacetate)-N'-(4-hydroxyphenyl acetate). Iron chelates such as SEQUESTRENE 138 Fe 100 are not presently recommended for use on potatoes.

We have now found that, surprisingly, improvements in potato quality may be obtained by treating the plants with a compound capable of forming a chelate with iron or a chelate of iron with a chelate-forming compound. The term "improvements in potato quality" includes improvements such as increased dry matter, increased starch content and reduction of reducing sugars. All three parameters are important quality parameters in potato production whether the potatoes are destined for direct sale or for further processing in the food industry.

Thus according to the present invention, there is provided a method of improving potato quality which comprises applying to the plant or to the locus of the plant a composition comprising (a) a compound capable of forming a chelate with iron or (b) a chelate of iron with a chelate-forming compound.

According to a further aspect of the invention there is provided a method of increasing the dry matter content of potatoes which comprises applying to the plant or to the locus of the plant a composition comprising (a) a compound capable of forming a chelate with iron or (b) a chelate of iron with a chelate-forming compound.

According to a still further aspect of the invention there is provided a method of increasing the starch content of potatoes which comprises applying to the plant or to the locus of the plant a composition comprising (a) a compound capable of forming a chelate with iron or (b) a chelate of iron with a chelate-forming compound.

According to a still further aspect of the invention there is provided a method of reducing the reducing sugar content of potatoes which comprises applying to the plant or to the locus of the plant a composition comprising (a) a compound capable of forming a chelate with iron or (b) a chelate of iron with a chelate-forming compound.

As used herein, the term "chelate-forming compound" includes any organic substance capable of forming a stable chelate with iron. The chelate-forming compound may be applied to the plant or the locus of the plant in the absence of actual chelation with iron (although chelation may subsequently take place with iron present in the soil) but is preferably applied as a chelate of iron with the chelate-forming compound, i.e. a product in which iron is already bound to the chelate-forming compound.

The chelate-forming compound is preferably soluble or miscible with water both in its unchelated form and as a chelate with iron As examples of compounds capable of forming a chelate with iron there may be mentioned ethylene diamine tetraacetate (EDTA); ethylenetriamine pentaacetate (DTPA); ethylene diamine dihydroxyphenyl acetate (EDDHA); ethylenediamine-di(o-hydroxy-o-methylphenylacetic) acid (EDDHMA); ethylenediamine-N,N'-bis(2-hydroxy-5-sulfonylphenyl) (EDDHSA) and ethylenediamine-di-(2-hydroxy-4-carboxyphenylacetic) acid (EDDCHA). Iron chelates may be a mixture of isomers, for example commercial EDDHA is mixture of iron (III) complexes of the two diastereoisomers of Ethylenediamine-N,N'-di(2-hydroxy-phenylacetate) and iron (III) complexes of the two diastereoisomers of ethylene diamine-N-(2-hydroxy-phenylacetate)-N'-(4-hydroxyphenyl acetate). Depending on the pH of the composition, the iron chelate may be present in the form of a salt, for example an alkali metal salt such as a sodium salt.

EDDHA NaFe is an especially preferred iron chelate and has an especially favourable physico-chemical behaviour in the soil. The commercial product SEQUESTRENE 138 Fe 100 is a useful source of a chelate of iron with EDDHA.

The chelate-forming compound or iron chelate may be applied in combination with conventional agrochemical adjuvants such as wetters, dispersants, surface-active agents and other activity enhancers or in combination with basic fertilizers or with crop protection products. The chelate-forming compound or iron chelate may be formulated as a solution in water or as a solid granule. If a solid granule is employed, the granule may be dissolved in water and applied as a spray or the granules may be applied directly to the soil and leached into the soil under the action of surface water. If the chelate-forming compound or iron chelate is applied as an aqueous spray, either foliar or soil application may be used. In general however soil application is preferred.

The chelate-forming compound or the iron chelate may be applied at any desired time and in particular at planting and/or at ridging but particularly during the early stages of plant development. The iron chelate may be applied in a single application or by split applications.

The iron content of the composition applied to the plants is preferably from 0% to 50% by weight of composition (where 0% indicates an unchelated chelate-forming compound), for example from 3% to 15% by weight and most preferably from 3% to 12% for example about 6% by weight, based on an application rate of from about 2 kg/ha to 50 kg/ha of composition (for example of SEQUESTRENE 138 Fe 100) and more particularly an application rate of about 3 kg/ha to 25 kg/ha of composition.

Where plants are grown in soils deficient in available iron, the process of the present invention provides the benefits of correction of iron deficiency in addition to the surprising benefits of improved potato characteristics. It is not however essential that the treatment of the present invention is used on plants grown in soils deficient in available iron.

The invention is illustrated by the following Examples in which all parts and percentages are by weight unless otherwise stated.

EXAMPLE 1

SEQUESTRENE 138 Fe 100 was applied to potatoes of variety "Spunta" in a soil with a pH of 7.9. The trial design was a randomized complete block system with four replicates and a plot size of 30 m². SEQUESTRENE 138 Fe 100 was dissolved in water and applied to the soil via drip irrigation system with 3 mm water/ha. The untreated control received water only. A single application at crop emergence was applied to the test plants at rates of 4 kg/ha, 8 kg/ha and 12 kg/ha respectively.

The dry matter content of the harvested potatoes (% by weight) was determined at 105° C. (48 hours). The results are indicated in Table 1.

The starch content of the harvested potatoes (% by weight) was measured according to the method of Shippers (1976) and the results are as indicated in Table 2.

The reducing sugar content of the harvested potatoes (% by weight) was measured by the 3,5-dinitrosalicylic acid method and the results are indicated in Table 3. Surprisingly, the Sequestrene 138 Fe 100 application increased the dry matter and starch content significantly and leads to a reduction of the reducing sugars. All the observed changes result in improved potato quality and/or processing characteristics.

TABLE 1

| Dry Matter content | |
|---|---|
| Treatment | Dry matter (%) |
| Untreated | 16.8 |
| Sequestrene, 4 kg/ha | 17.8 |
| Sequestrene, 8 kg/ha | 21.3 |
| Sequestrene, 12 kg/ha | 22.2 |

TABLE 2

| Starch content | |
|---|---|
| Treatment | Starch content (%) |
| Untreated | 10.7 |
| Sequestrene, 4 kg/ha | 11.6 |
| Sequestrene, 8 kg/ha | 14.9 |
| Sequestrene, 12 kg/ha | 15.6 |

TABLE 3

| Reducing Sugar Content | |
|---|---|
| Treatment | Reducing sugars (%) |
| Untreated | 0.51 |
| Sequestrene, 4 kg/ha | 0.45 |
| Sequestrene, 8 kg/ha | 0.42 |
| Sequestrene, 12 kg/ha | 0.39 |

The invention claimed is:

1. A method of increasing the dry matter content of potatoes and/or increasing the starch content of potatoes and/or reducing the reducing sugar content of potatoes which comprises applying to the potato plant or to the locus of the potato plant a composition comprising ethylene diamine dihydroxyphenyl acetate or an iron chelate of ethylene diamine dihydroxyphenyl acetate.

2. A method according to claim 1 wherein the ethylene diamine dihydroxyphenyl acetate or the iron chelate of the ethylene diamine dihydroxyphenyl acetate is formulated as a solution in water or as a solid granule.

3. A method according to claim 1 ethylene diamine dihydroxyphenyl acetate or the iron chelate of the ethylene diamine dihydroxyphenyl acetate is applied by soil application.

4. A method according to claim 1 wherein the iron content of the composition applied to the potatoes is from 0% to 50% by weight of composition based on an application rate of from about 2 kg/ha to 50 kg/ha of composition.

5. A method according to claim 1 wherein the iron content of the composition applied to the potatoes is from 3% to 12% by weight of composition based on an application rate of from about 3 kg/ha to 25 kg/ha of composition.

6. A method according to claim 1 wherein the iron content of the composition applied to the potatoes is about 6% by weight of composition based on an application rate of from about 3 kg/ha to 25 kg/ha of composition.

* * * * *